United States Patent [19]
Waggener, Jr. et al.

[11] Patent Number: 6,049,802
[45] Date of Patent: Apr. 11, 2000

[54] SYSTEM AND METHOD FOR GENERATING A LINKED LIST IN A COMPUTER MEMORY

[75] Inventors: William N. Waggener, Jr.; Thomas Albert Bray, both of Sarasota, Fla.

[73] Assignee: Lockheed Martin Corporation, Syosset, N.Y.

[21] Appl. No.: 08/265,965

[22] Filed: Jun. 27, 1994

[51] Int. Cl.[7] .................................................. G06F 9/445

[52] U.S. Cl. ............................ 707/100; 711/1; 711/100; 365/221

[58] Field of Search ...................................... 395/425, 600, 395/250, 400, 160, 650, 275, 700, 161, 119, 725; 380/49; 370/60, 230; 371/8.2; 365/221, 63, 230.06, 222; 714/705; 707/100, 1, 7; 711/154, 5, 133, 100, 221, 117, 170, 1

[56] References Cited

U.S. PATENT DOCUMENTS

| | | | |
|---|---|---|---|
| 5,210,744 | 5/1993 | Yamanaka et al. | 370/60 |
| 5,226,147 | 7/1993 | Fujishima et al. | 395/425 |
| 5,293,346 | 3/1994 | Nakajima et al. | 365/221 |
| 5,301,296 | 4/1994 | Mohri et al. | 395/425 |
| 5,303,302 | 4/1994 | Burrows | 380/49 |
| 5,359,568 | 10/1994 | Livay et al. | 365/221 |

FOREIGN PATENT DOCUMENTS

| | | |
|---|---|---|
| 0 378 195 | 7/1990 | European Pat. Off. . |
| 0 522 224 | 1/1993 | European Pat. Off. . |

OTHER PUBLICATIONS

Chang et al., "The Effect of Prioritization on the Behavior of a Concentrator Under an Accept, Otherwise Reject Strategy," *IEEE Transactions on Communications*, vol. 38, No. 7, pp. 1031–1039, Jul., 1990.

"Algorithm for Managing Multiple First–In, First–Out Queues From a Single Shared Random–Access Memory", *IBM Technical Disclosure Bulletin*, vol. 32, No. 3B, pp. 491–492, Aug. 1989.

Algorithms & Data Structures = Programs, Nicklaus Wirth, Prentice–Hill, Inc., Englewood Cliffs, NJ. 1976 pp. 171–182.

*Primary Examiner*—Larry D. Donaghue
*Attorney, Agent, or Firm*—Sterne, Kessler, Goldstein & Fox P.L.L.C.

[57] ABSTRACT

A system and method for storing data in a linked list memory architecture maintains several key list parameters. When data to be stored is received, a memory manager determines the list in which the data belongs and retrieves several of the parameters. The parameters retrieved indicate the address of the current location at which the received data is to be stored and the address of the next location that is to be linked to the current list. The memory manager writes the data to the current location pointed to by the first address and writes the second address into a pointer field in that current location. Because the address of the next location in the list is determined before data is written to the current location, this next address can be written in the same cycle in which the data is written.

20 Claims, 5 Drawing Sheets

SYSTEM AND METHOD FOR GENERATING A LINKED LIST IN A COMPUTER MEMORY

RELATED APPLICATIONS

This application is related to two commonly owned applications filed on even date herewith, the full disclosures of which are incorporated herein by reference as if reproduced in full below. These applications are titled "Packet Processor Having Service Priority and Loss Priority Features" and "System and Method for providing Multiple Loss and Service Priorities" Attorney Docket Numbers 0701.0420000, and 0701.0430000, respectively.

BACKGROUND OF THE INVENTION

1. Field of the Invention

The present invention relates generally to computer memories and more specifically to a system and method for generating one or more linked lists in a computer memory architecture.

2. Related Art

Contemporary computer memories are often partitioned by linking data in those memories in chains, or lists, according to data types. Data of a particular data type stored in memory can be linked to other data of the same type regardless of where the data are physically stored in the memory. For example, where data from multiple processes are being stored, it may be desirable to link the data from each particular process together with all the other data of the same data type from the same process. In this manner, several chains of data are formed, and each chain is dedicated to a particular data type.

Such memory linkages can be applied to memories used to store packetized data. In conventional packet memories using linkages, the data are stored in memory cells. Typically, each memory cell contains space for the data packet as well as a pointer to the next cell containing a packet of the same type. Thus, the cell pointer is used to link together cells containing the same type of data.

SUMMARY OF THE INVENTION

The present invention is directed toward a system and method for storing data in a linked list memory architecture. According to the invention, several key list parameters are maintained and are made easily accessible to a memory manager. When data to be stored in the memory is received, the memory manager retrieves the list parameters, writes the data to the correct memory location, and at the same time updates the pointer in that location to point to the next location in that list. Thus, each memory location in a list is updated with the pointer to the next location at the same time the data is written to the current location. Therefore, only one write cycle is required to write the data to memory and update the memory linkages.

In operation, when data is received, the memory manager looks up the address of the next available location at which data is to be stored (NEXT AVAILABLE ADDRESS) and an address indicating the next available undesignated space in memory (FREE LIST START ADDRESS). The data is written to the location pointed to by the NEXT AVAILABLE ADDRESS and the FREE LIST START ADDRESS is written as the pointer in that location to the NEXT AVAILABLE ADDRESS. This FREE LIST START ADDRESS then becomes the NEXT AVAILABLE ADDRESS. As a result, only one write cycle is required to store data and maintain the list linkages.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE EMBODIMENTS

The present invention is directed toward a system and method for storing data in a linked list memory architecture. The linked list architecture according to the present invention, uses a linkage pointer, or linkage address, associated with each memory location. The linkage pointer points to the location in memory at which the next data item in that list is stored. According to the present invention, when data is written to a memory location, the pointer to the next location is written at the same time. Because the pointer is "pre-loaded" with the next address when data is written to the current location, the system does not have to go back and write an address to that pointer when data is written to the next location. Thus, only one write cycle is required to write data to a memory location.

Figure 1:
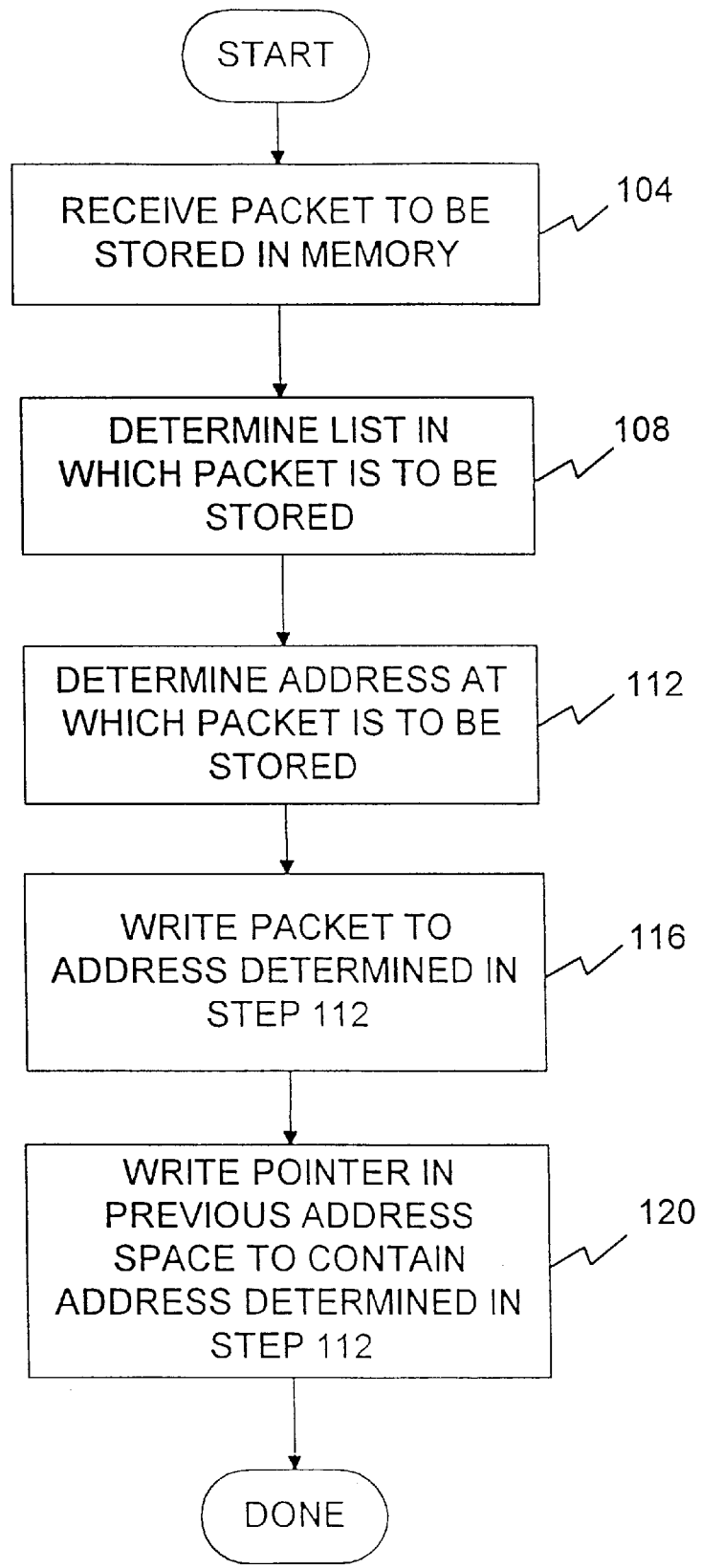
FIG. 1 illustrates one conventional process for linking data in memory.

According to one conventional method, multiple write cycles are required to store data in a list and update the linkages. FIG. 1 illustrates one conventional process for linking data in memory. Referring now to FIG. 1, in a step 104 packet data to be stored in memory are received. In a step 108, the memory manager determines the chain (or list) in which the received packet is to be stored. As stated above, the chain is dictated by the data type of the packet. For example, the packets may be linked according to a source or destination identification, a user identification, or a process identification.

In a step 112, the memory manager determines the address of the available memory space at which the received packet is to be stored. In a step 116, the packet is written to the location at that address.

As noted, each memory location has two fields: a data field to store the packet data; and a pointer field to store a pointer to the next space in memory for that chain. To maintain the linkage of the chain, the address determined in step 112 is written to the pointer field in the immediately preceding memory location in which data for that chain was written. This occurs in a step 120.

Thus, according to this conventional solution, the storing of data in memory requires two write cycles. One cycle to write the received packet into the designated location, and a second cycle to write the address of that designated location to the pointer field of the preceding location.

Figure 2:
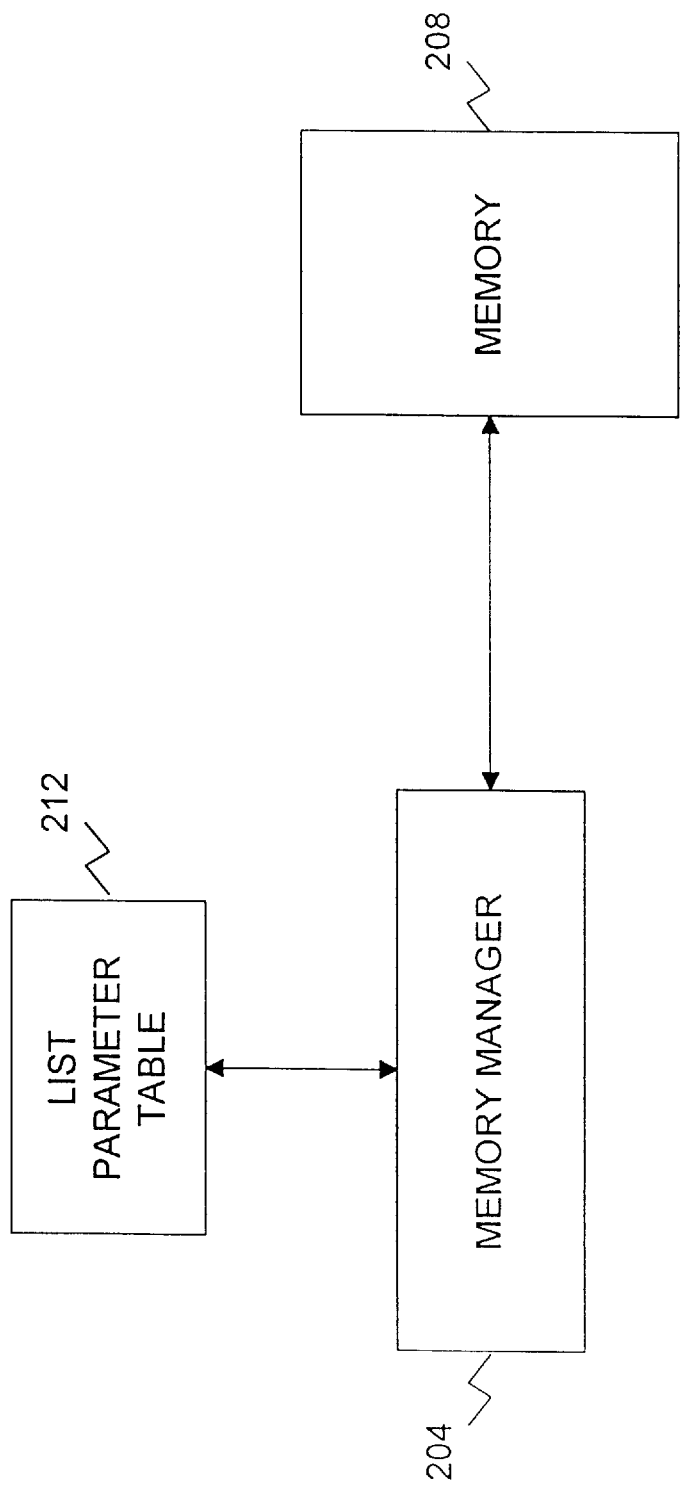
FIG. 2 is a high-level block diagram illustrating a representative architecture for storing data in a linked list memory according to one embodiment of the invention.
Figure 3:
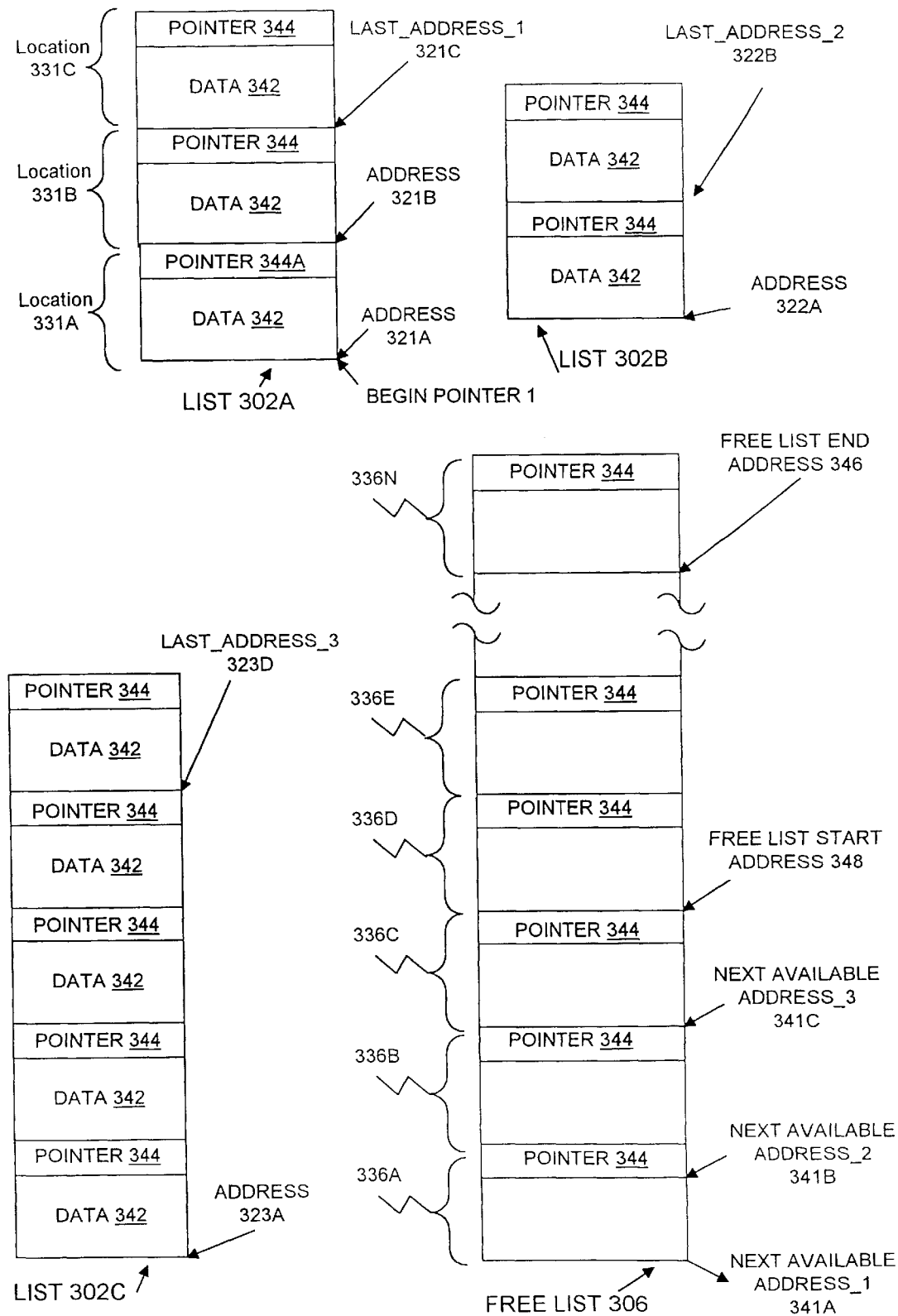
FIG. 3 is a diagram illustrating an example of how memory may be divided into several lists for storing data.

In contrast to this conventional solution, the present invention accomplishes the tasks of storing data in memory and updating the linkages. FIG. 2 is a high-level block diagram illustrating a representative architecture for storing data in a linked list memory according to one embodiment of the invention. Referring now to FIG. 2, the system includes a memory manager 204, a memory 208, and list parameters table 212. Memory 208 is divided into several virtual queues or lists (302A, 302B, 302C as illustrated in FIG. 3) using a linked list structure. List parameters table 212 stores list parameters used by memory manager 208 when storing data to memory 208 in one of the lists.

FIG. 3 is a diagram illustrating an example of how memory 208 may be divided into several lists for storing data. Referring now to FIG. 3, in this example, memory 208 is divided into three (3) lists 302A, 302B, 302C (generally referred to as list(s) 302) for storing data and a free list 306. Memory 208 could be divided into any number of lists 302, but three are illustrated here for simplicity of explanation. Lists 302 of the actual linked lists that contain data. This is in contrast to free list 306. Free list 306 is a linked list of locations 336 that are available for storing data therein. When data is received to be stored in a list 302, an available location 336 is taken from free list 306, attached to the appropriate list 302, and the data is stored therein.

According to the invention, when data 342 are received they are stored into one of the lists 302. Any of a number of parameters could be used to determine in which list 302 to store received data 342. For example, data 342 may be packet data that is classified according to a user's priority. In this example, it may be desirable to link together packets of data 342 in a specific list 302 based on each packet's priority. In this example, all data 342 having the highest priority could be stored in list 302A, while all data 342 having the next-highest priority could be stored in list 302B, and all data having the lowest priority could be stored in list 302C.

Each list 302 can include one or more storage locations 331. Each location 331 contains data 342 and a pointer 344. Pointer 344 points to the next location in that list. For example, in list 302A, location 331A contains data 342A and a pointer, 344A. Pointer 344A points to location 331B which is the next location in list 301. In one embodiment, pointer 344A actually contains the address 321B to location 331B.

Each list 302 also has associated list parameters. These parameters can include a LAST ADDRESS N, and a NEXT AVAILABLE ADDRESS N. As depicted in FIG. 3, LAST ADDRESS N is the address in memory 208 of the last location of a list N at which data 342 is stored. NEXT AVAILABLE ADDRESS N is the address in memory 208 of a location that is logically linked to list N, at the present time does not contain data 342, and is the location at which the next data 342 belonging to list N will be stored when it is input to memory 208.

For example, for list 302A, LAST ADDRESS 1 321C is the address at which location 331C begins. In this example, location 331C is the last location in list 301 at which data 342 is currently being stored. NEXT AVAILABLE ADDRESS 1 341A is the address at which location 336A begins. When data 342 is received that is destined for list 302A, that received data 342 will be stored in location 336A, and location 336A will be linked to list 302A. Therefore, the address pointing to this location 336A is NEXT AVAILABLE ADDRESS 1 341A.

Two additional parameters, FREE LIST START ADDRESS 348 and FREE LIST END ADDRESS 346 are used by memory manager 208 when storing data 342 in lists 302. FREE LIST START ADDRESS 348 points to location 336D in free list 306. Location 336D is the first location available for storing data 342 that has not already been designated as a next location 336A, 336B, 336C for a particular list. FREE LIST END ADDRESS 346 points to location 336N which is the last location in free list 306 that is available for storing data.

Note that pointers 344 in free list 306 must be pre-loaded to point to the next available location in free list 306. This is necessary when memory manager 208 updates list parameters table 212 to update the FREE LIST START ADDRESS 348.

A parameter BEGIN POINTER N indicates the address of the first location in a list N. For example, for list 302A, BEGIN POINTER 1 indicates address 321A of location 331A, the first location in list 302A. Once data is read out of location 331A, pointer 344A to the next location 331B in list 302A becomes the new BEGIN POINTER 1 parameter for list 302A.

Figure 4:
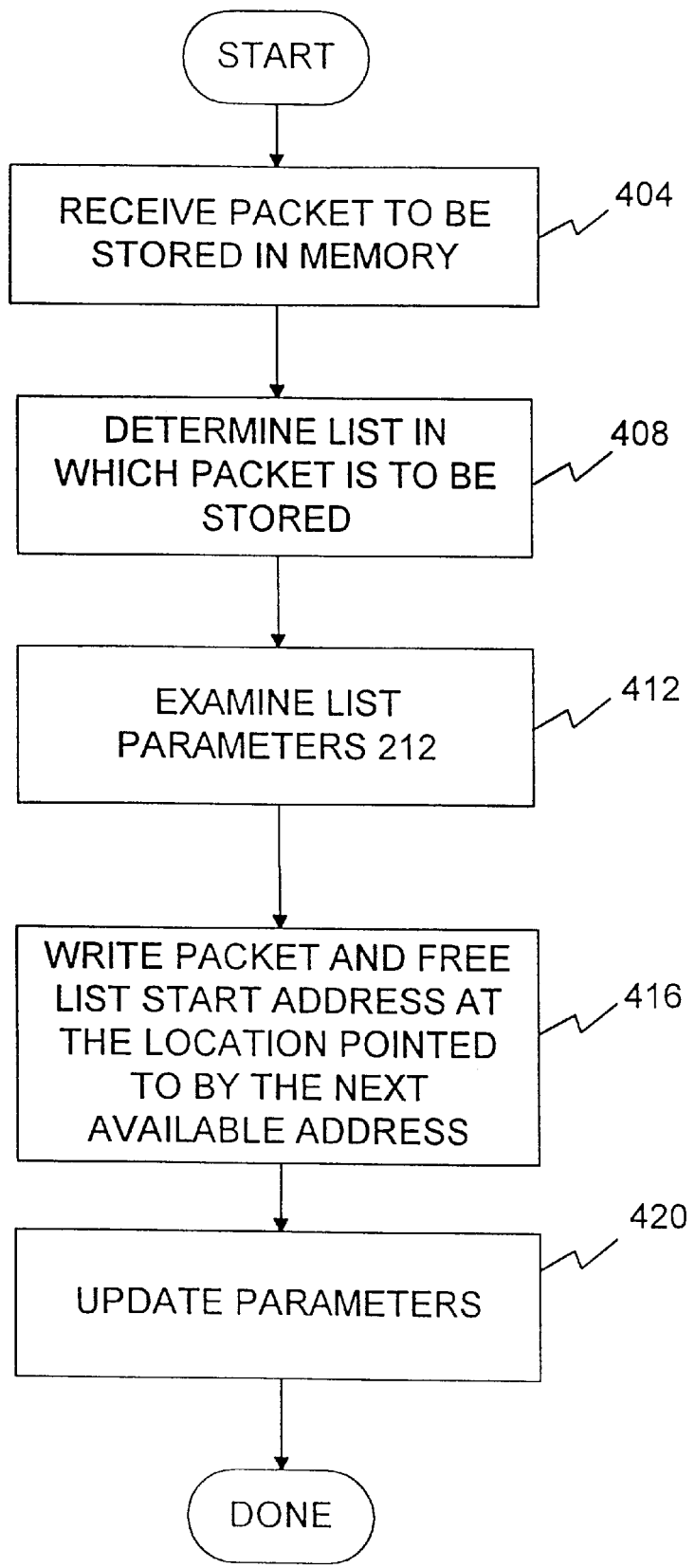
FIG. 4 is a flow diagram illustrating a process for storing data in a linked list according to the invention.

An overview of how data 342 are stored in memory 208 in one embodiment of the invention is now described. FIG. 4 is an operational flow diagram illustrating the manner in which data 342 is stored in memory 208. Referring now to FIGS. 2, 3, and 4, in a step 404 a packet of data 342 that is to be stored in memory 208 is received. In a step 408, the list 302 in which the packet of data 342 is to be stored is determined. As discussed above, this can be determined based on user identification, user priority, or other information contained in the packet header.

In a step 412, memory manager 208 examines list parameters 212 to determine where to store the received data 342. Specifically, memory manager 208 reads the NEXT AVAILABLE ADDRESS N 341. The NEXT AVAILABLE ADDRESS N 341 read is for the list N as determined in step 408 above.

In a step 416, memory manager 208 writes the received data 342 to the location pointed to by NEXT AVAILABLE ADDRESS N 341, and writes the FREE LIST START ADDRESS 348 to the pointer 344 in that location. As a result, the specific list 302 is updated to include the data 342 just received and a pointer 344 containing the FREE LIST START ADDRESS 348. This FREE LIST START ADDRESS 348 becomes the new NEXT AVAILABLE ADDRESS N 341 for that list.

In a step 420, memory manager 208 updates the parameters to reflect the fact that FREE LIST START ADDRESS 348 has now become the NEXT AVAILABLE ADDRESS N for the updated list and to also reflect that the address of the next open location in free list 306 becomes the new FREE LIST START ADDRESS 348. In an embodiment where free list 306 is linked using pointers 344, the pointer 344 in the location pointed to by FREE LIST START ADDRESS 348 (now NEXT AVAILABLE ADDRESS N) is used as the address for the new FREE LIST START ADDRESS 348.

As is evident from the above description, the data 342 can be written to a list 302 and the linkage is updated without having to use two write cycles. This is accomplished because at the same time data 342 is written to the new location, a pointer 344 to a next location is written as well. The new pointer 344 (FREE LIST START ADDRESS 348) is retrieved from list parameters table 212 at the same time that the NEXT AVAILABLE ADDRESS N is retrieved. Because there are only a few list parameters, they can be stored in a very small amount of storage space. Therefore, this storage space can be a rapid access memory without being cost prohibitive. Thus, the time required to retrieve and update the list parameters is very fast relative to the time it takes to write data 342 and pointers 344 to memory 208. Thus, the parameters can be retrieved quickly and the data 342 and new pointer 344 can be written to memory 208 in one write cycle. This provides a savings of one write cycle over the conventional method.

A more specific example of the above description is now provided. In this example, a packet of data 342 is received that is to be stored in list 302A (e.g., list N, where N=A). When the packet data 342 is received, memory manager 208 retrieves FREE LIST START ADDRESS 348 and NEXT AVAILABLE ADDRESS A 341A from list parameters table 212. Memory manager 208 stores data 342 in location 336A (pointed to by NEXT AVAILABLE ADDRESS A 341A) and stores FREE LIST START ADDRESS 348 as the pointer 344 in location 336A.

Memory manager 208 then updates the parameters in list parameters table 212 to reflect the fact that the original FREE LIST START ADDRESS 348 is updated to point to the next available location 336E in free list 306, and to reflect the fact that the previous FREE LIST START ADDRESS 348 is now the NEXT AVAILABLE ADDRESS A 341A for list 302A.

In one embodiment, the free list 306 is maintained just as any of the other linked lists are and free cells do not need to be contiguous. Upon initialization, all cells in memory are linked together with pointers in a contiguous manner. When data is stored and read, cells are allocated and de-allocated for the lists 302 and free list 306 becomes non-contiguous. In this embodiment, a new FREE LIST START ADDRESS 348 can be obtained by using pointer 344 in the location pointed to by the original FREE LIST START ADDRESS 348. Thus, when locations are used and reused, and free list 306 is no longer a contiguous chain of available memory, the pointers 344 in locations in free list 306 can be maintained to indicate the next cell in free list 306.

According to the invention, when data 342 is received, it is stored into one of the lists 302. As stated above, any of a number of factors could be used to determine in which list, 302 to store received data 342. For example, data 342 may be the packet data that is classified according to a user's priority, and it may be desirable to link together packets of data 342 in a specific list 302 based on this priority. For example, all data 342 having a user priority of one could be stored in list 302A, while all data 342 having a priority two could be stored in list 302B, and all data having a priority three could be stored in list 302C.

Because the order in which data 342 is received can be random, the lists are not made up of contiguous locations 331 in memory 208. That is, each list is not a physical queue made up of a series of locations one next to the other. Instead, each list is made up of locations 331 linked to one another by the pointer 344. Each location 331 has a pointer 344 pointing to the next location, which is not necessarily the next physical address space in memory 208. Thus, each list 301 is a logical list. To read data out of a list, memory manager 208 determines the address of the first data location to be read and reads the data from this first location. Memory manager 208, then reads the data in the location pointed to by the pointer in the first location. By repeating this cycle in an iterative manner, all the data from a particular list can be read out of the memory in order. As data locations are read out of memory, if the data does not need to be retained in those locations, the locations can be returned to free list 306 so that they can be used and reused when additional data 342 is received. When new locations are added to free list 306, FREE LIST END ADDRESS 346 is updated to reflect such addition.

Figure 5:
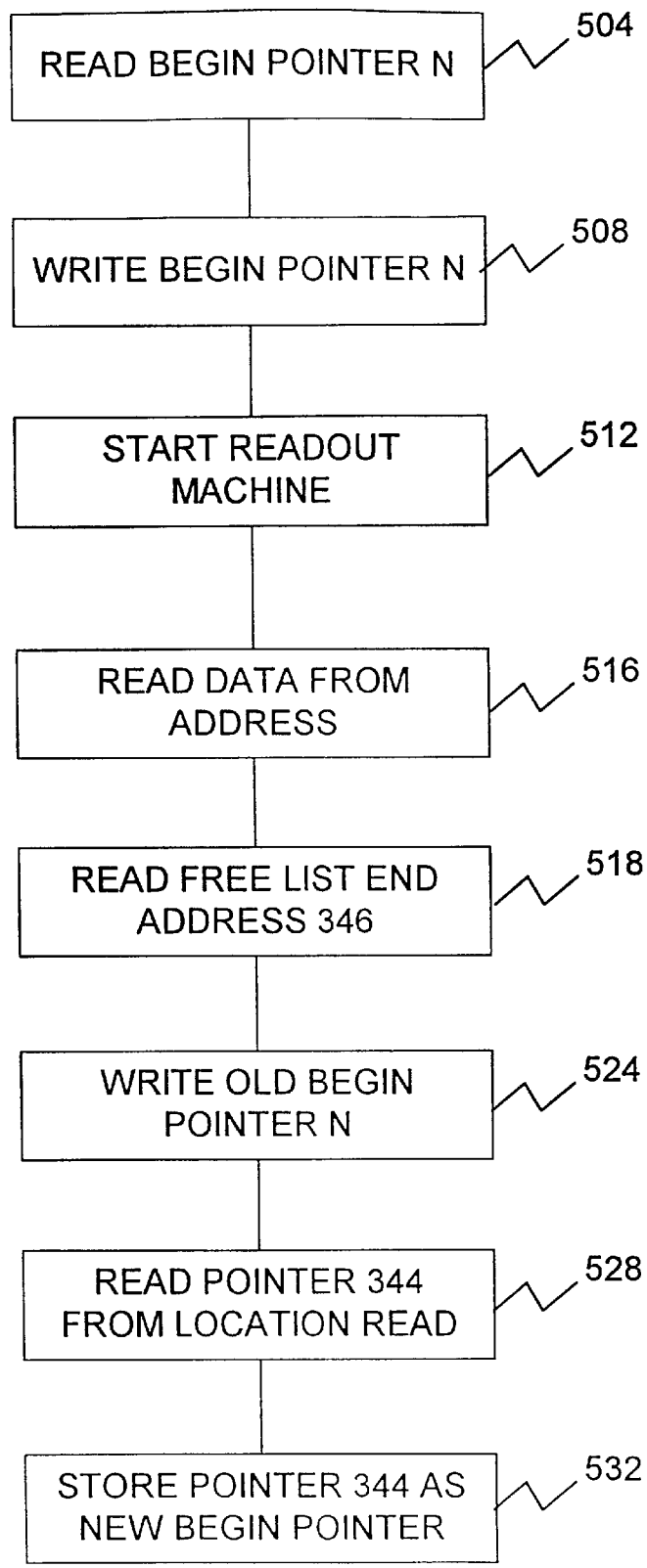
FIG. 5 is a flow diagram illustrating a process for reading data from the linked list according to the invention.

FIG. 5 is a flowchart illustrating a manner in which data may be read from a particular list 302. Referring now to FIGS. 2, 3, and 5, the read processes is now described. In a step 504, memory manager 208 reads BEGIN POINTER N from list parameters table 212. In one embodiment, memory manager 208 is a DSP (digital signal processor) and list parameters table 212 is a high speed memory device that can be quickly accessed by the DSP memory manager 208.

In a step 508, BEGIN POINTER N is provided to a read-out machine. After reading the description provided herein, the structure and operation of the read-out machine would be apparent to a person skilled in the relevant art. In a step 512 a command is sent to start the read-out machine, commanding it to read the cell. The readout machine continues to read the cell until the read-out buffer is full. This is illustrated by step 516. In step 516 the readout machine is reading data from the location pointed to by BEGIN POINTER N provided to it in step 508. Once data is read from the location at that address and sent to the proper destination, this location is no longer needed and must be returned to the free list 306.

In one embodiment, to return the now available location to free list 306, it is linked to the end of free list 306. Thus, in a step 518, memory manager 208 reads FREE LIST END ADDRESS 346 from list parameters 212. The pointer 344 in the last location in free list 306 (i.e., the location pointed to by FREE LIST END ADDRESS 346) is updated to point to the now-available address. This will link the now-available address to the end of free list 306. Therefore, in a step 524, the old BEGIN POINTER N that now points to the now-available address is written to pointer 344 in the location pointed to by FREE LIST END ADDRESS 346.

When the data 342 is read out of the memory location, the pointer 344 which was in that location is read in a step 528. This pointer points to the new beginning location 331 for that particular list 302. For example, if data 342A is read out of location 331A, pointer 344A which pointed to address 321B of location 331B is read. This pointer 344 (344A in the above example) is stored as the new BEGIN POINTER N for that list (list 302A in the above example).

Although the above description was provided in terms of data 342, being packet data or data cells, it would be apparent to a person skilled in the relevant art how this system and method could be implemented using data 342 other than packet data.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for storing data in a memory having a plurality of linked lists and a free list, comprising the steps of:

(a) determining one of the plurality of linked lists in which data is to be stored;
   (b) determining a next available address for said linked list determined in said step (a), wherein said next available address points to a current location at which the data is to be stored for said linked list;
   (c) determining a free list start address, wherein said free list start address indicates an address of an available location in the free list; and
   (d) writing the data and said free list start address to said current location in a single write cycle.

2. The method of claim 1, wherein said steps (b) and (c) of determining said next available address and said free list start address comprise the steps of retrieving said next available address and said free list start address from a table.

3. The method of claim 2, further comprising the steps, after said step (d) of:

(e) storing in said table said free list start address determined in said step (c) as said next available address for said linked list; and
   (f) incrementing said free list start address in said table.

4. The method of claim 2, further comprising the steps, after said step (d) of:

(e) storing in said table said free list start address determined in said step (c) as said next available address for said linked list; and
   (f) storing in said table a pointer from said available location as said free list start address.

5. The method of claim 1, further comprising a step (e) of linking a now-available location to the free list after data has been read from said now-available location.

6. The method of claim 5, wherein said step (e) comprises the steps of:

(f) determining a free list end address, wherein said free list end address indicates the address of a last location in the free list that is available for storing data;
   (g) updating a pointer in said last location to point to said now-available location.

7. The method of claim 6, wherein said step (e) further comprises the step (h) of updating said free list end address to indicate the address of said now-available location.

8. A system for storing data in one of a plurality of linked lists, comprising:

a memory having a plurality of linked lists and a free list;
   first means for determining one of the plurality of linked lists in which data is to be stored;
   second means for determining a next available address for said linked list, wherein said next available address indicates a current location in said memory at which the data is to be stored for said linked list;
   third means for determining a free list start address, wherein said free list start address indicates an address of an available location in the free list; and
   fourth means for writing the data and said free list start address to said current location in a single write cycle.

9. The system of claim 8, wherein said means for determining said next available address and said free list start address comprises means for retrieving said next available address and said free list start address from a table.

10. The system of claim 9, further comprising:

means for storing in said table said free list start address determined by said third means as said next available address for said linked list; and
    means for incrementing said free list start address in said table.

11. The system of claim 9, further comprising:

means for storing in said table said free list start address determined by said third means as said next available address for said linked list; and
    means for storing in said table a pointer from said available location as said free list start address.

12. The system of claim 8, wherein said memory manager further comprises means for linking a now-available location to the free list after data has been read from said now-available location.

13. The system of claim 12, wherein said means for linking said now-available location comprises:

means for determining a free list end address, wherein said free list end address indicates the address of a last location in the free list that is available for storing data; and
    means for updating a pointer in said last location to point to said now-available location.

14. The system of claim 12, wherein said means for linking said now-available location comprises means for updating said free list end address to indicate the address of said now-available location.

15. A memory system for storing data in a memory having a plurality of memory locations linked together in one or more linked lists, comprising:

table means for storing list parameters, wherein said list parameters comprise a next available address for each of the linked lists, and a free list start address; and
    memory manager means, comprising
        means for determining in which of the linked lists the data is to be stored,
        means for retrieving said next available address for said linked list in which the data is to be stored and for retrieving said free list start address, and
        means for writing in a single cycle the data and said free list start address to the location indicated by said next available address.

16. The memory system of claim 15, wherein said memory manager further comprises:

means for storing said free list start address as said next available address after said data and free list start address are written to said location; and means for updating said free list start address in said table to indicate the address of a next available location in the free list.

17. The memory system of claim 15, wherein said memory manager further comprises means for linking a now-available location to the free list after data has been read from said now-available location.

18. The memory system of claim 17, wherein said means for linking said now-available location comprises:

means for determining a free list end address, wherein said free list end address indicates the address of a last location in the free list that is available for storing data; and means for updating a pointer in said last location to point to said now-available location.

19. The memory system of claim 18, wherein said means for linking said now-available location comprises means for updating said free list end address to indicate the address of said now-available location.

20. A method for storing data in a memory having a plurality of linked lists and a free list, comprising the steps of:

(a) determining a next available address for each said linked list, wherein said next available address points to a location at which data is to be stored for a corresponding linked list;

(b) determining a free list start address, wherein said free list start address indicates an address of an available location in the free list that has not been designated as said next available address for any one of the plurality of linked lists, wherein said free list start address becomes a new next available address for a linked list that has been written to; and (c) writing the data and said free list start address to one of said next available addresses in a single write cycle.

\* \* \* \* \*